April 8, 1958   R. H. HALLMAN   2,829,496
SERVO CIRCUIT WITH VARIABLE BACK-PRESSURE RETURN
Filed Dec. 5, 1955

INVENTOR.
RUSSELL H. HALLMAN
BY
Van Meter and George
ATTORNEYS

United States Patent Office 2,829,496
Patented Apr. 8, 1958

2,829,496

SERVO CIRCUIT WITH VARIABLE BACK-PRESSURE RETURN

Russell H. Hallman, Royal Oak, Mich., assignor to Vickers Incorporated, Detroit, Mich., a corporation of Michigan Application December 5, 1955, Serial No. 551,109

4 Claims. (Cl. 60—52)

This invention relates to power transmissions, and is particularly applicable to those of the type comprising two or more fluid pressure energy translating devices, one of which may function as a pump and another as a fluid motor.

More particularly the invention relates to an improved power transmission for use with a variable speed prime mover such as a motor vehicle engine.

Power steering has been used widely on heavy vehicles and off the road mobile equipment for many years. However, it is only since the recent wide acceptance of power steering on passenger vehicles that the problem of noise generated in these systems has become critical. The use of an open center servo valve to control the vehicle steering motor is almost universal. It has been found that a considerable part of the noise is produced by the flow of oil through the servo valve while it is in and near the neutral, central position. It has further been found that if a back pressure is maintained in the return line from the servo valve, not only will much noise be eliminated from the system, but the response characteristics are improved, especially during low speed operation.

At high speed, the engine and road noise level increases to a point where the sound saving achieved through maintaining back pressure on the servo return line becomes insignificant. Thus, the disadvantage of the prior systems, which maintain continuous back pressure, has been that substantial power is wasted during high speed operation, and further, this wasted energy causes heating of the circulating fluid.

It is an object of this invention to provide an improved low cost power transmission for use with a variable speed prime mover in which a variable back pressure is maintained in the servo valve return line.

It is also an object to provide such a transmission in which the back pressure is reduced as the prime mover speed increases beyond a predetermined point.

Further objects and advantages of the present invention will be apparent from the following description, reference being had to the accompanying drawing wherein a preferred form of the present invention is clearly shown.

Figure 2:
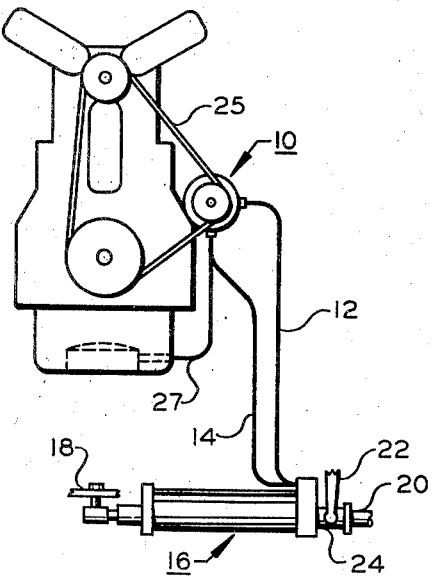
Figure 2 illustrates such an improved power transmission as it might be installed in a particular motor vehicle.

Referring first to Figure 2, the pumping mechanism, generally designated 10, is connected by a delivery conduit 12, and a return conduit 14, to a steering booster generally designated 16. Steering booster 16 may be of the type illustrated in U. S. Patent No. 2,022,698 to H. F. Vickers. Such a booster might be affixed to the vehicle frame at 18, and connected into the steering linkage through a drag link 20. Operation of booster 16 is under control of the vehicle pitman arm 22 which shifts the usual open center control valve inside the valve body 24 to actuate the steering motor. Pump 10 is illustrated as being driven by the fan belt 25 of the vehicle engine. Fluid is supplied to the pump inlet through a conduit 27 leading from the engine oil pump. If desired, the pump inlet may be supercharged by the engine oil pump.

Figure 1:
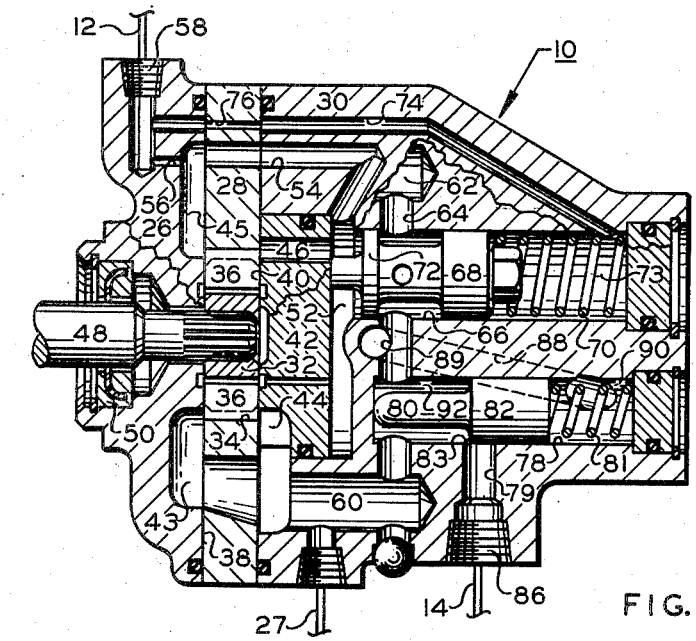
Figure 1 is a cross-sectional view of pumping mechanism and associated valving for use in a power transmission embodying the present invention.

The pump 10 includes a body member 26, a ring or stator member 28, and a head member 30. A rotor 32 is telescopically disposed in an elliptically shaped bore 34 in ring 28. Radially slideable vanes 36 extend from the rotor 32 to engage the elliptical bore 34, and the in-and-out motion of the vanes produces the pumping action. The ring 28, rotor 32, and vanes 36 are axially sandwiched between a face 38 of the body member 26, and a face 40 of a pressure plate 42. Two pairs of inlet ports 43 and 44, only one pair of which is shown in Figure 1, communicate with the expanding intervane spaces and two pairs of discharge ports 45 and 46, only one pair of which is shown in Figure 1, communicate with the contracting intervane chambers. Rotor 32 is supported on and driven by a drive shaft 48 which is surrounded by a conventional shaft seal 50. Shaft 48 may be an extension of the vehicle generator shaft, or may be coupled to the vehicle engine in any suitable manner.

The pumping structure thus far described is conventional in nature and forms no part of the present invention. It is only important to note that the discharge from the pumping mechanism, except for that discharged directly into port 45, is manifolded in the pressure chamber 52 behind the pressure plate 42. Pressure chamber 52 communicates through a passage 54 with the discharge port 45. Discharge port 45 communicates across a metering orifice 56 with an external delivery connection port 58, to which is coupled the delivery conduit 12. It will thus be seen that the entire quantity of fluid which is discharged from pump 10 to the servo valve in the steering booster 16 must pass over the metering orifice 56.

The pairs of inlet ports 43 and 44 are supplied with fluid by a pair of axial passages 60 and 62 in the head member 30. A transverse passage 64 establishes communication between passages 60 and 62. A first valve bore 66 extends from the pressure chamber 52 into head member 30 to intersect the transverse passage 64. A flow control valve 68 is slideably disposed in the bore 66 and is biased by a spring 70 to a position such that the valve land 72 blocks communication between the pressure chamber 52 and the transverse passage 64.

Spool 68 has equal and opposed areas exposed to pressures in pressure chamber 52 and in the valve spring chamber 73. A pressure sensing passage 74 extends from a point downstream of the metering orifice 56 to the spring chamber 73. Passage 74 includes a flow damping restriction 76. In the lower speed range of the vehicle engine, spring 70 maintains the valve spool 68 in the position illustrated. As the vehicle engine speed increases, however, a point is reached at which the pressure drop across the metering orifice 56, acting on the opposed areas of spool 68, overcomes the spring 70 and shifts spool 68 to the right, establishing communication between pressure chamber 52 and the transverse passage 64. As the pump discharge tends to exceed the cracking point of valve 68, additional quantities of fluid are by-passed from the pump discharge zones to the pump inlet zones, thus maintaining flow across the metering orifice 56 to the steering booster servo valve at a relatively constant value. Such flow control systems are in wide use for maintaining a substantially constant flow rate to a steering booster.

The body member 30 includes a second valve bore 78 which intersects both the transverse passage 64 and a return passage 79, to which is connected return conduit 14. Bore 78 has a valve spool 80 therein which is biased by a spring 81 to the illustrated position. The valve spool 80 includes a land 82 which, in the spring biased position, forms a restriction 83 to flow between passage 79, which communicates with the external connection port 86 and return conduit 14, and the transverse passage 64. A sensing passage 88 conducts pressure from a pressure pick-off hole 89 to the spring chamber 90.

Pick-off hole 89 perpendicularly intersects the transverse passage 64 at a point proximate to the point where land 72 of valve 68 opens and closes communication between pressure chamber 52 and passage 64. Since the pressure in chamber 52 will normally be high relative to the pressure in passage 64, fluid diverted from pressure chamber 52 into passage 64 by the opening of valve 68 will attain a high velocity. The particular arrangement of valve bore 66, transverse passage 64, and the pick-off passage 89 is such as to utilize this high velocity to produce a pressure differential which controls shifting of valve spool 82.

It can be seen that when the valve spool 68 cracks to establish communication between chamber 52 and transverse passage 64, a high velocity jet will spurt across the pick-off hole 89. According to known physical laws, the high velocity of this fluid jet is accompanied by a low static pressure. Specifically, the static pressure which is conducted by pick-off hole 89 and passage 88 to the spring chamber 90 is of a lower magnitude than the pressure in the balance of the pump inlet passages, which includes the chamber 92 at the left end of valve bore 78. Since valve spool 80 has equal and opposed areas exposed to pressure in chambers 90 and 92, valve 80 may be shifted to the right against spring 81 as a result of fluid being by-passed from chamber 52 to the pump inlet zones. Rightward shifting of spool 80 reduces the flow restrictive effect of land 82, and establishes freer communication between the passage 79 and transverse passage 64.

In operation, with the vehicle engine operating at a low speed, the valve spools 68 and 80 will be in the position illustrated. As the pump speed increases, a point will be reached at which the pressure drop across the metering orifice 56 will cause the flow control valve 68 to shift and divert fluid to the pump inlet zones. Up to this point, the entire discharge of the pumping mechanism will pass to the steering booster servo valve. It is in the low speed ranges that the noise generated by oil flow through the servo valve is particularly troublesome. The present invention minimizes this noise by restricting the return line from the servo valve by use of the restriction valve 80. The restriction 83 created by land 82 is so selected as to produce the desired back pressure in the return line 14 during low speed operation of the pumping mechanism. This desired back pressure may, for example, be of the order of a maximum of 50 pounds per square inch.

Restriction 83 would in this case be selected so that 50 pounds per square inch back pressure would be produced in return line 14 by that flow rate which, when passing across metering orifice 56, causes valve 68 to crack. It should be noted that flow rate across orifices 56 and 83 is substantially equal. As the flow of by-passed fluid into passage 64 increases slightly, spool 82 will be shifted farther to the right so as to practically eliminate the restriction to return flow from booster 16.

There has thus been provided an improved power transmission in which a back pressure is maintained on the motor return line at low speeds of the prime mover, and in which that restriction may be reduced to any desired degree as the speed of the prime mover increases. This has been accomplished in a low cost, and functionally dependable manner. The practice of the present invention enables power saving at high prime mover speeds and reduces the undesirable heating of the circulating fluid.

While the form of embodiment of the invention as herein disclosed constitutes a preferred form, it is to be understood that other forms might be adopted, all coming within the scope of the claims which follow.

What is claimed is as follows:

1. In a power steering system having a variable speed prime mover driving a fixed displacement pump connected by delivery and return conduits to a servo valve which controls a fluid motor, the combination of: flow control valve means to divert fluid from said delivery conduit; means for controlling said flow control valve responsive to flow rate to said servo valve; a variable restriction in said return line for maintaining a back pressure therein; and means responsive to flow of said diverted fluid to control said variable restriction.

2. In a power steering system having a variable speed prime mover driving a fixed displacement pump connected by delivery and return conduits to a servo valve which controls a fluid motor, the combination of: means forming a by-pass passage leading to said return conduit; flow control valve means to divert fluid from said delivery conduit into said by-pass passage; means for controlling said flow control valve responsive to flow rate to said servo valve; and a plunger forming a variable restriction in said return line for maintaining a back pressure therein and having opposed areas exposed to a flow-rate responsive pressure differential at spaced points in said by-pass passage, said pressure-differential acting on said areas being effective to shift said plunger in response to flow of said diverted fluid.

3. In a power steering system having a variable speed prime mover driving a fixed displacement pump connected by delivery and return conduits to a servo valve which controls a fluid motor, the combination of: flow control valve means to divert fluid from said delivery conduit as a high velocity jet; means for controlling said flow control valve responsive to flow rate to said servo valve; a variable restriction in said return line for maintaining a back pressure therein; and means responsive to the velocity produced pressure reduction created by said jet to control said variable restriction.

4. In a power steering system having a variable speed prime mover driving a fixed displacement pump connected by delivery and return conduits to a servo valve which controls a fluid motor, the combination of: means forming a by-pass passage leading to said return conduit; flow control valve means to divert fluid from said delivery conduit into said by-pass passage as a high velocity jet; means for controlling said flow control valve responsive to flow rate to said servo valve; and a plunger forming a variable restriction in said return line for maintaining a back pressure therein and having opposed areas exposed to a pressure differential resulting from velocity differences in said by-pass passage, said pressure differential acting on said areas being effective to shift said plunger in response to flow of said diverted fluid.

References Cited in the file of this patent

UNITED STATES PATENTS

| | | |
|---|---|---|
| 1,970,181 | Monroe | Aug. 14, 1934 |
| 2,477,669 | Stephens | Aug. 2, 1949 |
| 2,603,065 | Sarto | July 15, 1952 |
| 2,674,092 | Gardiner | Apr. 6, 1954 |

OTHER REFERENCES

Ser. No. 366,840, Obtresal (A. C. P.), published Apr. 27, 1943.